US009386047B2

(12) United States Patent
Wang et al.

(10) Patent No.: US 9,386,047 B2
(45) Date of Patent: Jul. 5, 2016

(54) METHOD, SWITCH, SERVER AND SYSTEM FOR SENDING CONNECTION ESTABLISHMENT REQUEST

(71) Applicant: Huawei Technologies Co., Ltd., Shenzhen (CN)

(72) Inventors: Xuewei Wang, Shenzhen (CN); Mingming Zhu, Shenzhen (CN); Yinben Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 13/909,411

(22) Filed: Jun. 4, 2013

(65) Prior Publication Data

US 2013/0268686 A1    Oct. 10, 2013

Related U.S. Application Data

(63) Continuation of application No. PCT/CN2012/072316, filed on Mar. 14, 2012.

(51) Int. Cl.
*H04L 29/06* (2006.01)
*H04L 12/24* (2006.01)
*H04L 29/12* (2006.01)

(52) U.S. Cl.
CPC ........ *H04L 65/1069* (2013.01); *H04L 41/0809* (2013.01); *H04L 61/2015* (2013.01)

(58) Field of Classification Search
CPC ..... H04L 65/1069; H04L 51/00; H04L 41/00; H04L 43/00; H04L 61/00; H04L 65/00; H04L 67/00; H04L 69/00; H04L 41/809; H04L 61/2015
See application file for complete search history.

(56) References Cited

U.S. PATENT DOCUMENTS 6,898,183 B1 * 5/2005 Garakani ................ H04L 45/12
370/230
2005/0114341 A1 * 5/2005 Droms ............. H04L 29/12273
(Continued)

FOREIGN PATENT DOCUMENTS

CN    102349268 A    2/2012
CN    102365846 A    2/2012
(Continued)

OTHER PUBLICATIONS

Open Networking Foundation, OpenFlow Configuration and Management Protocol 1.0 (OF-Config 1.0), Dec. 23, 2011, TS-004, 73 pages.*
(Continued)

*Primary Examiner* — Wing F Chan
*Assistant Examiner* — Billy H Ng
(74) *Attorney, Agent, or Firm* — Brinks Gilson & Lione

(57) ABSTRACT

A method for sending a connection establishment request is provided, comprising: sending a parameter requesting message to a configuration server from an OpenFlow switch for obtaining connection parameters of an OpenFlow controller; receiving by the OpenFlow switch an Internet Protocol (IP) address and a set of OpenFlow controller connection parameters sent from the configuration server, the set of connection parameters comprising at least connection parameters of a first OpenFlow controller; sending a connection establishment request message to the first OpenFlow controller from the OpenFlow switch according to the IP address and the connection parameter of the first OpenFlow controller. An OpenFlow switch, a configuration server and a system for sending a connection establishment request are also provided. With the solutions provided in embodiments of the disclosure, the automatic connection establishment between the OpenFlow switch and the OpenFlow controller can be realized.

15 Claims, 3 Drawing Sheets

(56) References Cited

U.S. PATENT DOCUMENTS

| | | |
|---|---|---|
| 2011/0261825 A1 | 10/2011 | Ichino |
| 2011/0286359 A1 | 11/2011 | Shimonishi |
| 2013/0039214 A1* | 2/2013 | Yedavalli et al. .............. 370/254 |
| 2015/0009828 A1 | 1/2015 | Murakami |

FOREIGN PATENT DOCUMENTS

| | | |
|---|---|---|
| JP | 2002152261 A | 5/2002 |
| JP | 2007-520970 A | 7/2007 |
| JP | 2009141446 A | 6/2009 |
| JP | 2009-153050 A | 7/2009 |
| JP | 2010-062598 A | 3/2010 |
| JP | 2011-160363 A | 8/2011 |
| WO | WO 2005/086427 A1 | 9/2005 |
| WO | WO 2009/081688 A1 | 7/2009 |
| WO | WO 2013/133227 A1 | 9/2013 |

OTHER PUBLICATIONS

Charles M. Kozierok, TCP/IP Guide, Oct. 4, 2005, No Starch Press, ISBN-13: 978-1-59327-047-6, 1648 pages.*

Open Networking Foundation, OpenFlow Switch Specification 1.2, Dec. 5, 2011, TS-003, 82 pages.*

International Search Report issued in corresponding PCT Patent Application No. PCT/CN2012/072316, mailed Dec. 20, 2012, 10 pages.

"Open Flow Discovery Protocol" http://groups.geni.net/geni/wiki/OpenFlowDiscoveryProtocol, Oct. 2010, printed from Internet Oct. 17, 2013, 2 pages.

"OpenFlow Network Programming" Software Design, May 2011, 16 pages.

Alexander et al., "DHCP Options and BOOTP Vendor Extensions" Network Working Group, Mar. 1997, 35 pages.

McKeown et al., "OpenFlow: Enabling Innovation in Campus Networks" Mar. 14, 2008, 6 pages, http://openflow.org/documents/openflow-wp-latest.pdf.

Onf et al., "OpenFlow Configuration and Management Protocol OF-CONFIG 1.0" Nov. 23, 2011, 74 pages http://www.opennetworking.org/images/stories/downloads/sdn-resources/onf-specifications/openflow-config/of-configldot0-final.pdf.

"DHCP Configuration for Failover" TechNet, Feb. 2012, 13 pages, https://technet.microsoft.com/ja-jp/library/hh831385(d=printer).aspx.

* cited by examiner

METHOD, SWITCH, SERVER AND SYSTEM FOR SENDING CONNECTION ESTABLISHMENT REQUEST

CROSS-REFERENCE TO RELATED APPLICATIONS

This application is a continuation of International Application No. PCT/CN2012/072316, filed on Mar. 14, 2012, which is hereby incorporated by reference in its entirety.

FIELD

The present disclosure relates to the field of communication techniques, and more particular, to a method, OpenFlow switch, configuration server and system for sending a connection establishment request.

BACKGROUND

With the continuous evolution and development of network techniques, forwarding and control element separation is a trend. OpenFlow provides a novel network model, and an OpenFlow network may comprise two types of devices: OpenFlow controller and OpenFlow switch. An OpenFlow controller is responsible for the centralized controlling of the network, sending flow tables to OpenFlow switches, and the OpenFlow controller is open to users; an OpenFlow switch performs packet matching and forwarding according to the flow tables. In this manner, a user can define flows on the OpenFlow controller by himself and control paths of the flows in the network, so that network control can be given to users.

Before communicating between an OpenFlow switch and an OpenFlow controller, a connection between the OpenFlow switch and the OpenFlow controller has to be established. In order to realize establishment of such a connection, parameters can be manually configured for the connection to be established. After completing configuration of the parameter of the connection to be established, the OpenFlow switch and the OpenFlow controller can perform connection establishment actions according to the parameter of the connection to be established. Configuring parameters for a connection to be established manually may lead to lower efficiency of establishing the connection between the OpenFlow switch and the OpenFlow controller, which is adverse to rapid connection establishment.

SUMMARY

Method, OpenFlow switch, configuration server and system for sending a connection establishment request are provided in embodiments of the disclosure, to solve the problem that in an OpenFlow network an OpenFlow switch is unable to obtain connection parameters of an OpenFlow controller actively and to automatically establish a connection to the OpenFlow controller.

An aspect of an embodiment of the disclosure provides a method for sending a connection establishment request in an OpenFlow network with forwarding and control element separation. In the method, an OpenFlow switch sends a parameter requesting message to a configuration server, the parameter requesting message being used to request to obtain connection parameters of an OpenFlow controller. The OpenFlow switch receives an Internet Protocol (IP) address and a set of connection parameters of an OpenFlow controller sent from the configuration server, the set of connection parameters comprising at least connection parameters of a first OpenFlow controller. The OpenFlow switch sends a connection establishment request message to the first OpenFlow controller according to the IP address and the connection parameters of the first OpenFlow controller sent from the configuration server.

Another aspect of an embodiment of the disclosure provides an OpenFlow switch, which is suitable for an OpenFlow network with forwarding and control element separation. The OpenFlow switch includes: a parameter requesting unit, configured to send a parameter requesting message to a configuration server, the parameter requesting message being used to request to obtain connection parameters of an OpenFlow controller; a parameter receiving unit, configured to receive an Internet Protocol (IP) address and a set of connection parameters of an OpenFlow controller sent by the configuration server, the set of connection parameters comprising at least connection parameters of a first OpenFlow controller; a connection request sending unit, configured to send a connection establishment request message to the first OpenFlow controller according to the IP address and the connection parameters of the first OpenFlow controller sent from the configuration server.

Another aspect of an embodiment of the disclosure provides a configuration server, which the configuration is suitable for an OpenFlow network with forwarding and control element separation. The configuration server includes: a parameter request receiving unit, configured to receive a parameter requesting message sent from an OpenFlow switch, the parameter requesting message being used to request to obtain connection parameters of an OpenFlow controller; a storage unit, configured to store a set of connection parameters of an OpenFlow controller in the OpenFlow network, the set of connection parameters comprising at least connection parameters of a first OpenFlow controller; a parameter sending unit, configured to send an Internet Protocol (IP) address and a set of connection parameters of the OpenFlow controller to the OpenFlow switch according to the parameter requesting message.

According to still another aspect of an embodiment of the disclosure, a system for sending a connection establishment request is provided, which is suitable for an OpenFlow network with forwarding and control element separation. The system comprises an OpenFlow switch and a configuration server.

The OpenFlow switch includes: a parameter requesting unit, configured to send a parameter requesting message to the configuration server, the parameter requesting message being used to request to obtain connection parameters of an OpenFlow controller; a parameter receiving unit, configured to receive an Internet Protocol (IP) address and a set of connection parameters of an OpenFlow controller sent by the configuration server, the set of connection parameters comprising at least connection parameters of a first OpenFlow controller; and a connection request sending unit, configured to send a connection establishment request message to the first OpenFlow controller according to the IP address and the connection parameters of the first OpenFlow controller sent from the configuration server; and The configuration server includes: a parameter request receiving unit, configured to receive the parameter requesting message sent from an OpenFlow switch, the parameter requesting message being used to request to obtain connection parameters of an OpenFlow controller; a storage unit, configured to store a set of connection parameters of an OpenFlow controller in the OpenFlow network, the set of connection parameters comprising at least the connection parameters of a first OpenFlow controller; a parameter sending unit, configured to send the Internet Protocol (IP) address and the set of connection parameters of the OpenFlow controller to the OpenFlow switch according to the parameter requesting message.

In summary, with the solutions provided in embodiments of the disclosure, in an OpenFlow network, through obtaining the connection parameter of an OpenFlow controller from a configuration server, an OpenFlow switch actively sends a connection establishment request to the OpenFlow controller to realize the automatic connection establishment between the OpenFlow switch and the OpenFlow controller.

BRIEF DESCRIPTION OF THE DRAWINGS

To illustrate the solutions in the embodiments of the present disclosure more clearly, accompanying drawings required for describing the embodiments are briefly introduced in the following. Apparently, the accompanying drawings in the following description merely show some embodiments of the present disclosure, and persons of ordinary skill in the art may still derive other drawings from these accompanying drawings without creative efforts.

DETAILED DESCRIPTION OF THE EMBODIMENTS

To make objects, solutions and advantages of embodiments of the present disclosure clearer, solutions of embodiments of the present disclosure are described explicitly and completely. Apparently, the embodiments described herein are only a part of embodiments of the present disclosure, but not all embodiments. All other embodiments, which are derived by persons of ordinary skill in the art from the embodiments in the present disclosure without creative efforts, fall within the scope of the present disclosure.

An OpenFlow controller is a device in an OpenFlow network, which can control the OpenFlow network. The OpenFlow controller may send flow tables to an OpenFlow switch. The OpenFlow switch is also a device in the OpenFlow network, which can forward packets according to the flow tables. As for the OpenFlow controller, the OpenFlow switch and the OpenFlow network, reference can be consulted to "OpenFlow Switch Specification 1.0" issued by the standard establishment organization of ONF (OpenFlow Networking Foundation).

The OpenFlow controller is responsible for the centralized control of the network and sending flow tables to OpenFlow switches that are under management, so that a connection to each of the OpenFlow switches under management has to be established at first. For example, the connection can be established by the TCP (Transmission Control Protocol) protocol, the SSL (Secure Sockets Layer) protocol, the TLS (Transport Layer Security) protocol, or the UDP (User Datagram Protocol) protocol. Embodiments of the disclosure are not limited thereto.

Figure 1:
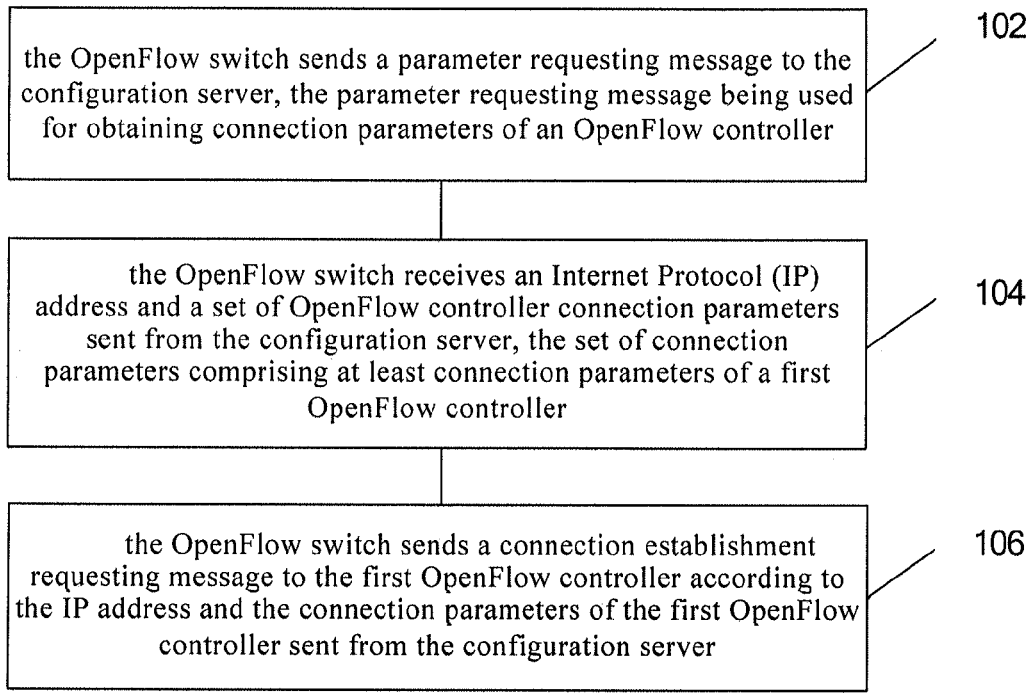
FIG. 1 is a schematic flowchart of a method for sending a connection establishment request provided in an embodiment of the disclosure.

Referring to FIG. 1, a method for sending a connection establishment request is provided in an embodiment of the disclosure, which is suitable for an OpenFlow network with forwarding and control element separation, and comprises the following steps.

102: the OpenFlow switch sends a parameter requesting message to a configuration server, the parameter requesting message being used to request to obtain connection parameters of an OpenFlow controller.

In a particular implementation of this embodiment, before the OpenFlow switch sends the parameter requesting message to the configuration server, the OpenFlow switch and the configuration server can run a layer 2 network communication protocol in advance. The OpenFlow switch generates a first path according to the layer 2 network communication protocol, which is a path from the OpenFlow switch to the configuration server. The OpenFlow switch sends the parameter requesting message through the first path. The layer 2 network communication protocol may be a MSTP (Multiple Spanning Tree Protocol) protocol, a TRILL (Transparent Interconnection of Lots of Links) protocol or a Shortest Path Bridging (802.1aq) protocol. When the layer 2 network communication protocol is the MSTP protocol, the configuration server is configured to be a MSTP root node. For example, when the layer 2 network communication protocol is the TRILL protocol, running the TRILL protocol by the OpenFlow switch and the configuration server particularly comprises: the OpenFlow switch and the configuration server first enable the TRILL protocol globally, respectively, then the OpenFlow switch enables the TRILL protocol on a port which the port is connected to the configuration server, and the configuration server enables the TRILL protocol on a port which the port is connected to the OpenFlow switch.

Optionally, the configuration server may be a Dynamic Host Configuration Protocol (DHCP) server or a Point-to-Point protocol over Ethernet (PPPoE) server.

Figure 2:
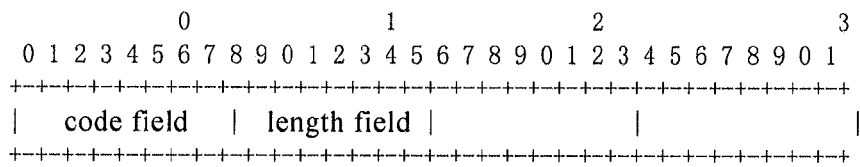
FIG. 2 is a schematic diagram of the format of a first expanded DHCP option provided in an embodiment of the disclosure.

Optionally, the configuration server can be preset such that after receiving the parameter requesting message sent from the OpenFlow switch, the configuration server may send a set of connection parameters of the OpenFlow controller to the OpenFlow switch. The configuration server may also determine from information carried by the parameter requesting message that the parameter requesting message is used for obtaining the connection parameters of the OpenFlow controller. Particularly, when the configuration server is a DHCP server, the parameter requesting message is a DHCP request message, particular implementation of which may refer to RFC2131 defined by the IETF (Internet Engineering Task Force). The DHCP request message may comprise a first expanded DHCP option, as shown in FIG. 2. The first expanded DHCP option may comprise:

a code field for identifying whether a parameter requesting message containing the first expanded DHCP option is used for obtaining connection parameters of an OpenFlow controller, the code field having 8 bits with any value in its value range that is not defined or used by other options, optionally, a value of 214;

a length field for identifying the length of data content included in the first expanded DHCP option, the length field having 8 bits.

For example, when the first expanded DHCP option is used for obtaining parameters of an OpenFlow controller, the length field has a value of zero, so that when the DHCP request message is received by the DHCP server, the DHCP server determines that the length field of the first expanded DHCP option has a value of zero, and thus deems that the DHCP request message is used for obtaining the connection parameters of the OpenFlow controller.

Figure 3:
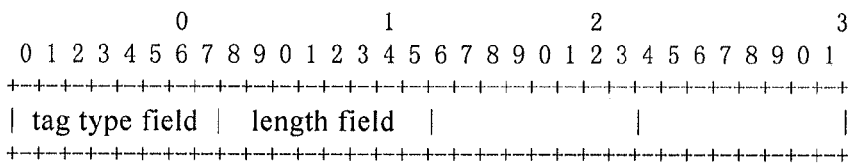
FIG. 3 is a schematic diagram of the format of a first expanded TAG provided in an embodiment of the disclosure.

When the configuration server is a PPPoE server, the parameter requesting message is a PPPoE request message, particular implementation of which may refer to RFC2516 defined by the IETF. Optionally, the PPPoE request message may comprise a first expanded tag (TAG), as shown in FIG. 3. The first expanded TAG may comprise:

a tag type field for identifying whether a parameter requesting message containing the first expanded TAG is used for obtaining connection parameters of an OpenFlow controller, the tag type field having 8 bits with any value in its value range that is not defined or used by other options, preferably, a value of 203;

a length field for identifying the length of data content included in the first expanded TAG, the length field having 8 bits.

For example, when the first expanded TAG is used for obtaining parameters of an OpenFlow controller, the length field has a value of zero, so that when the PPPoE request message is received by the PPPoE server, the PPPoE server determines that the length field of the first expanded TAG has a value of zero, and thus deems that the PPPoE request message is used for obtaining the connection parameters of an OpenFlow controller.

104: the OpenFlow switch receives an Internet Protocol (IP) address and a set of connection parameters of an OpenFlow controller sent from the configuration server, the set of connection parameters comprising at least connection parameters of a first OpenFlow controller.

106: the OpenFlow switch sends a connection establishment request message to the first OpenFlow controller according to the IP address and the connection parameters of the first OpenFlow controller sent from the configuration server.

The configuration server needs to store connection parameters of OpenFlow controllers in a network it serves. The configuration server may store connection parameters of some or all OpenFlow controllers in the network it serves.

Optionally, stored connection parameters of an OpenFlow controller can be achieved by a pre-configuration process, or can be obtained dynamically from an OpenFlow controller in a network that is served by the configuration server. The embodiment does not have limitation on its particular implementation manner.

Optionally, before the OpenFlow switch sends the connection establishment request message to the first OpenFlow controller, a layer 2 network communication protocol can be run between the first OpenFlow controller and the OpenFlow switch. The first OpenFlow switch generates a second path according to the layer 2 network communication protocol. The second path is a path from the OpenFlow switch to the first OpenFlow controller, and the OpenFlow switch sends the connection establishment request message through the second path.

Figure 4:
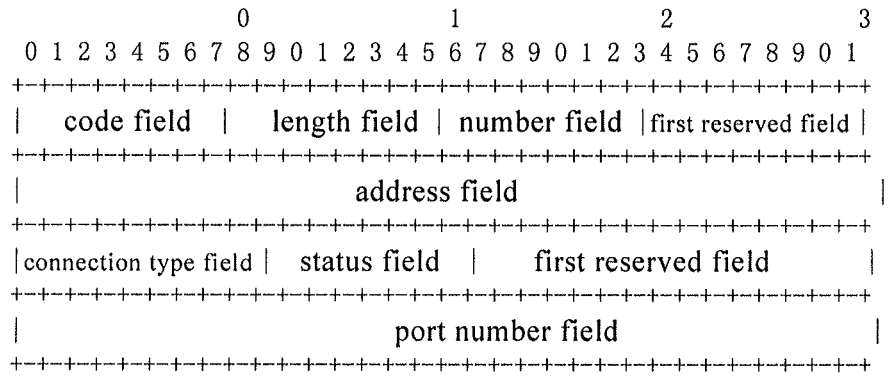
FIG. 4 is a schematic diagram of the format of a second expanded DHCP option provided in an embodiment of the disclosure.

The connection parameters of the first OpenFlow controller comprise an IP address of the first OpenFlow controller, a port number for connection establishment of the first OpenFlow controller and a connection establishment type of the first OpenFlow controller. Optionally, the connection parameters of the first OpenFlow controller may further comprise a status of the first OpenFlow controller, particularly, a primary status or a backup status. After the configuration server receives the parameter requesting message sent from the OpenFlow switch, it may send a parameter reply message to the OpenFlow switch. If the configuration server is a DHCP server, the parameter reply message may be a DHCP Reply message sent from the DHCP server to the OpenFlow switch, and the DHCP reply message contain an IP address allocated to the OpenFlow switch. The OpenFlow switch is configured with the IP address after receiving the DHCP reply message. The set of connection parameters provided from the DHCP server to the OpenFlow switch can be contained in the DHCP reply message and carried by a second expanded DHCP option. The set of connection parameters comprises at least the connection parameters of a first OpenFlow controller, which may be any one of the OpenFlow controllers in the OpenFlow network served by the DHCP server. Referring to FIG. 4 for the second expanded DHCP option, the second expanded DHCP option may comprise:

a code field, configured to identify whether the second expanded DHCP option contains connection parameters of the OpenFlow controller, the code field having 8 bits with any value in its value range that is not defined or used by other options, optionally, a value of 215;

a length field, configured to identify a length of data content included in the second expanded DHCP option, the length field having 8 bits;

a number field, configured to identify a number of OpenFlow controller connection parameters carried by the second expanded DHCP option, the number field having 8 bits;

an address field, configured to identify an IP address of an OpenFlow controller in the OpenFlow controller connection parameters contained in the second expanded DHCP option, the address field having 32 bits;

a connection type field, configured to identify a connection establishment type of an OpenFlow controller in the OpenFlow controller connection parameters contained in the second expanded DHCP option, wherein the connection type field has 8 bits, and the connection type may be TCP, SSL, UDP, or TLS;

a port number field, configured to identify a connection establishment port of an OpenFlow controller in the OpenFlow controller connection parameters contained in the second expanded DHCP option, the connection establishment port number field having 32 bits.

Optionally, the second expanded DHCP option may further comprise a status field, which is configured to identify the status of the connection parameters of the OpenFlow controller in the OpenFlow controller connection parameters contained in the second expanded DHCP option, where the status field has 8 bits, and the status may be a primary status or a backup status. For example, when the status field is non-zero, it represents the connection parameters of the OpenFlow controller is in the primary status; when the status field is zero, it represents the connection parameters of the OpenFlow controller is in the backup status.

Optionally, the second expanded DHCP option may further comprises a first reserved field and a second reserved field, which can be defined or expanded by a user.

The embodiment does not have limitation on the order of the various fields contained in the second expanded DHCP option in a packet, and FIG. 4 is merely an illustration.

Optionally, the DHCP reply message may further comprise a DHCP option 125; the OpenFlow switch creates a logic interface according to the DHCP option 125, and the OpenFlow switch may establish a connection with the first OpenFlow controller through the logic interface.

The connection parameters of the first OpenFlow controller may be carried by the DHCP reply message as follows:

an IP address of the first OpenFlow controller is stored in the address field of the second expanded DHCP option in the DHCP reply message;

a connection establishment port number of the first OpenFlow controller is stored in the port number field of the second expanded DHCP option in the DHCP reply message;

a connection establishment type of the first OpenFlow controller is stored in the connection type field of the second expanded DHCP option in the DHCP reply message;

a status of the first OpenFlow controller is stored in the status field of the second expanded DHCP option in the DHCP reply message.

Figure 5:
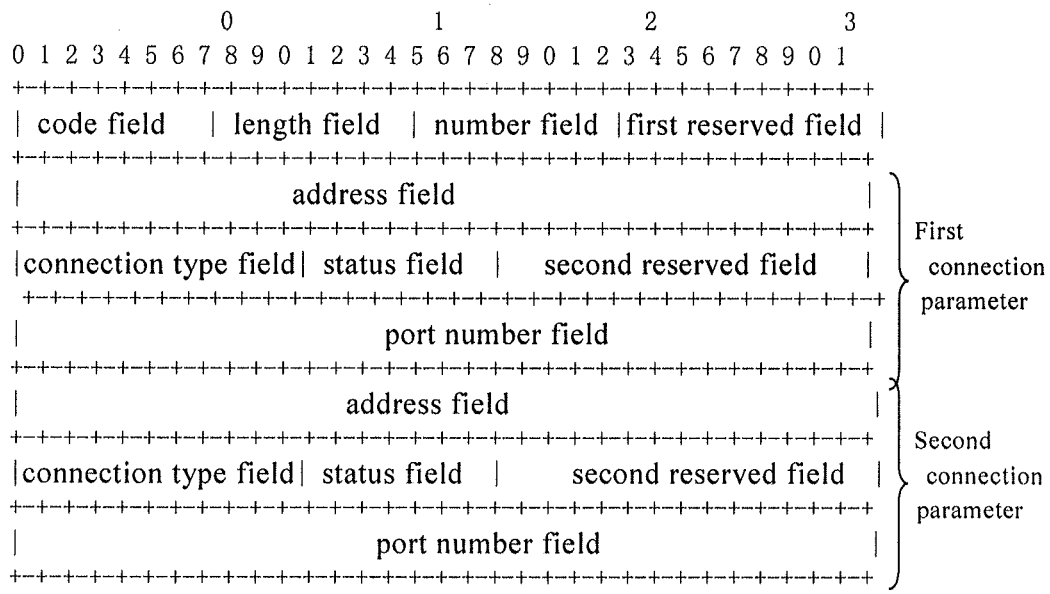
FIG. 5 is a schematic diagram of an example of the format of the second expanded DHCP option provided in an embodiment of the disclosure.

In order to facilitate understanding of the second expanded DHCP option, an example will be described below. For example, referring to FIG. 5, by convention, the code field of the second expanded DHCP option may be 215. After a DHCP reply message sent from the DHCP server is received by the OpenFlow switch, the OpenFlow switch parses the code field of the second expanded DHCP option. If the code field has a value of 215, it determines that the second expanded DHCP option of the second DHCP reply message comprises OpenFlow controller connection parameters. When it is determined that the number field of the second expanded DHCP option has a value 2, the OpenFlow switch parses and thus obtains a first connection parameter and then a second connection parameter, and stores the first and second connection parameters. Further, assuming that the status field of the first connection parameter is a primary status and the status field of the second connection parameter is a backup status, the OpenFlow switch sends a connection establishment request to an OpenFlow controller corresponding to the first connection parameter and establishes a connection to the OpenFlow controller corresponding to the first connection parameter. If the OpenFlow controller corresponding to the first connection parameter is fault, causing disconnection of the OpenFlow switch from the OpenFlow controller corresponding to the first connection parameter, the OpenFlow switch may sends a connection establishment request to an OpenFlow controller corresponding to the second connection parameter. Thus, it can guarantee that the OpenFlow switch can establish a connection to the OpenFlow controller corresponding to the second connection parameter in time, so that service flows can be processed timely, and traffic break can be avoided.

Optionally, the code field of the first expanded DHCP option and the code field of the second expanded DHCP option may have a same value. For example, the code fields of the two DHCP options may both have a value of 215, i.e., the first expanded DHCP option and the second expanded DHCP option are a same single DHCP option. Whether a message containing the same single DHCP option is a parameter requesting message or a parameter reply message can be distinguished depending on the length field of the single DHCP option. When the length field of the single DHCP option has a value 0, it can be determined that the message containing the single DHCP option described above is a parameter requesting message; when the length field of the single DHCP option has a non-zero value, the message containing the single DHCP option described above is a parameter reply message.

Figure 6:
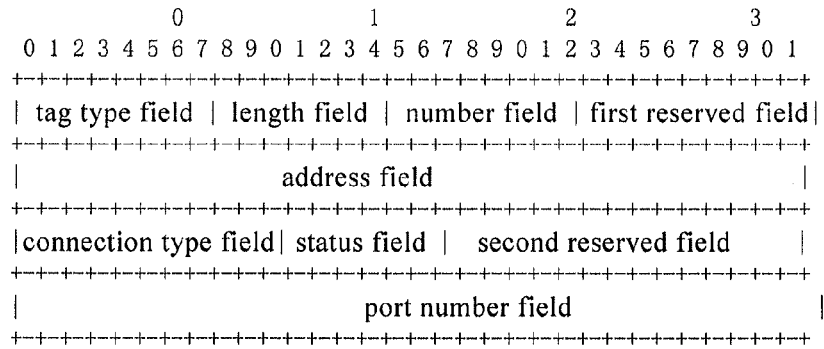
FIG. 6 is a schematic diagram of the format of a second expanded TAG provided in an embodiment of the disclosure.

Optionally, when the configuration server is a PPPoE server, the parameter reply message is a PPPoE reply message sent from the PPPoE server to the OpenFlow switch. The PPPoE reply message may comprise an IP address allocated to the OpenFlow switch. The OpenFlow switch is configured with the IP address after receiving the DHCP reply message. The set of connection parameters provided from the PPPoE server to the OpenFlow switch can be contained in the PPPoE reply message and carried by a second expanded TAG. The set of connection parameters comprises at least connection parameters of a first OpenFlow controller, which may be any one of the OpenFlow controllers in the OpenFlow network served by the PPPoE server. Referring to FIG. 6 which shows the second expanded TAG, the second expanded TAG may comprise:

a tag type field, configured to for identify whether the second expanded TAG comprises OpenFlow controller connection parameters, the tag type field having 8 bits with any value in its value range that is not defined or used by other options, optionally, a value of 204;

a length field, configured to identify a length of data content included in the second expanded TAG, i.e., a content length of the OpenFlow controller connection parameters contained in the second expanded TAG, the length field having 8 bits;

a number field, configured to identify a number of the OpenFlow controller connection parameters carried by the second expanded TAG, the length field having 8 bits;

an address field, configured to identify an IP address of an OpenFlow controller contained in the second expanded TAG, the address field having 32 bits;

a connection type field, configured to identify a connection establishment type of an OpenFlow controller in the OpenFlow controller connection parameters contained in the second expanded TAG, where the connection type field has 8 bits and may be TCP, SSL, UDP, or TLS;

a port number field, configured to identify a connection establishment port of an OpenFlow controller in the OpenFlow controller connection parameters contained in the second expanded TAG, the connection establishment port number field having 32 bits.

Optionally, the second expanded TAG may further comprise a status field, which is configured to identify a status of connection parameters of an OpenFlow controller contained in the second expanded TAG. The status field has 8 bits, and the status is a primary status or a backup status. For example, when the status field is non-zero, it represents connection parameters of an OpenFlow controller is in a primary status; when the status field is zero, it represents connection parameters of an OpenFlow controller is in a backup status.

Optionally, the second expanded DHCP option may further comprises a first reserved field and a second reserved field, which can be defined or expanded by users.

This embodiment does not have limitation on order of the various fields contained in the second expanded TAG in a packet, and FIG. 6 is merely an illustration.

The connection parameters of the first OpenFlow controller is carried by the PPPoE reply message as follows:

an IP address of the first OpenFlow controller is stored in the address field of the second expanded TAG in the PPPoE reply message;

a connection establishment port number of the first OpenFlow controller is stored in the port number field of the second expanded TAG in the PPPoE reply message;

a connection establishment type of the first OpenFlow controller is stored in the connection type field of the second expanded TAG in the PPPoE reply message;

a status of the first OpenFlow controller is stored in the status field of the second expanded TAG in the PPPoE reply message.

Optionally, the code field of the first expanded TAG and the code field of the second expanded TAG may have a same value. For example, the code fields of the two expanded TAG may both have a value of 215, i.e., the first expanded TAG and the second expanded TAG are a same single TAG. Whether a message containing a same single TAG is a parameter requesting message or a parameter reply message can be distinguished depending on the length field of the single TAG. When the length field of the single TAG has a value 0, it can be determined that the message containing the single TAG described above is a parameter requesting message; when the length field of the single TAG has a non-zero value, it can be determined that the message containing the single TAG described above is a parameter reply message.

Optionally, the set of connection parameters sent from the configuration server to the OpenFlow switch may be transmitted by the OpenFlow switch through a configuration management channel. The configuration management channel may be established by the OpenFlow switch and the configuration server according to a OpenFlow management and Configuration Protocol (OF-config) in advance. Reference can be made to OF-config defined by ONF for a particular manner of establishing the configuration management channel.

Optionally, when there are connection parameters of only one OpenFlow controller in the set of connection parameters, the OpenFlow switch directly selects the connection parameters of that OpenFlow controller as connection parameters of the first OpenFlow controller. When there are connection parameters of multiple OpenFlow controllers in the set of connection parameters, connection parameters of a certain OpenFlow controller can be selected as connection parameters of the first OpenFlow controller according to a certain selection criteria. The selection criteria may be defined by a user. For example, the OpenFlow switch may be configured in advance so that the OpenFlow controllers that can be selected by the OpenFlow switch have to meet a following condition: the selected OpenFlow controller has an IP address belonging to a certain network segment.

After the OpenFlow switch sends the connection establishment request message to the first OpenFlow controller, a connection may be established between the OpenFlow switch and the first OpenFlow controller. The connection may be a TCP connection, a particular connection establishment manner of which may refer to RFC793 defined by IETF, a SSL connection, a particular connection establishment manner of which may refer to RFC2246 defined by IETF, a TLS connection, a particular connection establishment manner of which may refer to RFC2246 defined by IETF, or a UDP connection, a particular connection establishment manner of which may refer to RFC768 defined by IETF.

After the connection is established between the first OpenFlow controller and the OpenFlow switch, the OpenFlow switch receives a layer 2 network communication flow table and an automatic configuration network flow table sent from the first OpenFlow controller, and stores the layer 2 network communication flow table and the automatic configuration network flow table. Information on a path from the OpenFlow switch to the configuration server is stored in the layer 2 network communication flow table and the automatic configuration network flow table, and the path information can be produced as follows.

After the connection is established between the first OpenFlow controller and the OpenFlow switch, the OpenFlow switch and the configuration server execute a neighbor discovery protocol, and the first OpenFlow controller executes a neighbor discovery protocol and a topology collection protocol. The first OpenFlow controller computes path information from the OpenFlow switch to the configuration server based on the neighbor discovery protocol and the topology collection protocol. The neighbor discovery protocol may be a Link Layer Discovery Protocol (LLDP) or an Intermediate System To Intermediate System (ISIS) Protocol, and the topology collection protocol may be a OpenFlow Discovery Protocol (OFDP) or a Neighbor Topology Discovery Protocol (NTDP). The neighbor discovery protocol executed by the OpenFlow switch has to be in consistent with the neighbor discovery protocol executed by the configuration server. For instance, in a case that the first OpenFlow switch executes LLDP, the configuration server has to execute LLDP also.

The layer 2 network communication flow table is used for layer 2 network communication protocol message interaction between the OpenFlow switch and the configuration server. When the layer 2 network communication protocol is MSTP, the layer 2 network communication protocol messages are Bridge Protocol Data Unit (BPDU) messages; when the layer 2 network communication protocol is TRILL, the layer 2 network communication protocol messages are Complete Sequence Number Packets (CSNP).

The automatic configuration network flow table is used for configuration message interaction between the OpenFlow switch and the configuration server. When the configuration server is a DHCP server, the configuration messages are DHCP requesting message and DHCP reply message; when the configuration server is a PPPoE server, the configuration messages are PPPoE requesting message and PPPoE reply message.

Optionally, after the OpenFlow switch sends the connection establishment request to the first OpenFlow controller, the OpenFlow switch receives a control channel protocol flow table sent from the first OpenFlow controller and stores the control channel protocol flow table, in which optimal path information from the OpenFlow switch to the first OpenFlow controller is stored. A optimal path is produced as follows.

The OpenFlow switch sends a connection establishment requesting message to the first OpenFlow controller. After a connection is established between the first OpenFlow controller and the OpenFlow switch, the OpenFlow switch executes a neighbor discovery protocol, and the first OpenFlow controller executes a neighbor discovery protocol and a topology collection protocol. The first OpenFlow controller calculates an optimal path from the OpenFlow switch to the first OpenFlow controller based on the neighbor discovery protocol and the topology collection protocol. The optimal path is a path having the lowest load which is selected upon a comprehensive consideration of load situations of all paths between the OpenFlow switch and the first OpenFlow controller. Optionally, the optimal path is the shortest path from the OpenFlow switch to the first OpenFlow controller. Subsequent connection interactive packets between the OpenFlow switch and the first OpenFlow controller will be forwarded by using of the control channel protocol flow table. For example, when the OpenFlow switch receives a connection establishment requesting message sent to the first OpenFlow controller from another OpenFlow switch, the OpenFlow switch forwards the connection establishment requesting message to the first OpenFlow controller using the control channel protocol flow table.

Optionally, the OpenFlow switch may receive a layer 2 network communication protocol function closing message sent from the first OpenFlow controller, and the OpenFlow switch closes the layer 2 network communication protocol function accordingly. The layer 2 network communication protocol message interaction between the OpenFlow switch and the configuration server take advantage of the layer 2 network communication flow table, and the configuration message interaction between the OpenFlow switch and the configuration server take advantage of the automatic configuration network flow table. The first OpenFlow controller may send the layer 2 network communication protocol function closing message through the configuration management channel, which is created by the OpenFlow switch and the configuration server through OF-config in advance. Reference can be made to OF-config defined by ONF for a particular creation manner of the configuration management channel.

The DHCP server may be a regular DHCP server, or an OpenFlow controller or OpenFlow switch having a function of a DHCP server, or a regular router or switch having a functions of a DHCP server, The PPPoE server may be an access concentrator (AC), an OpenFlow controller or OpenFlow switch having a function of a PPPoE server, or a regular router or switch having a function of a PPPoE server.

Thus, with the method provided in embodiments of the disclosure, in the OpenFlow network, through obtaining connection parameters of the OpenFlow controller from the configuration server, the OpenFlow switch actively sends a connection establishment request to the OpenFlow controller, thereby realizing an automatic connection establishment between the OpenFlow switch and the OpenFlow controller.

Figure 7:
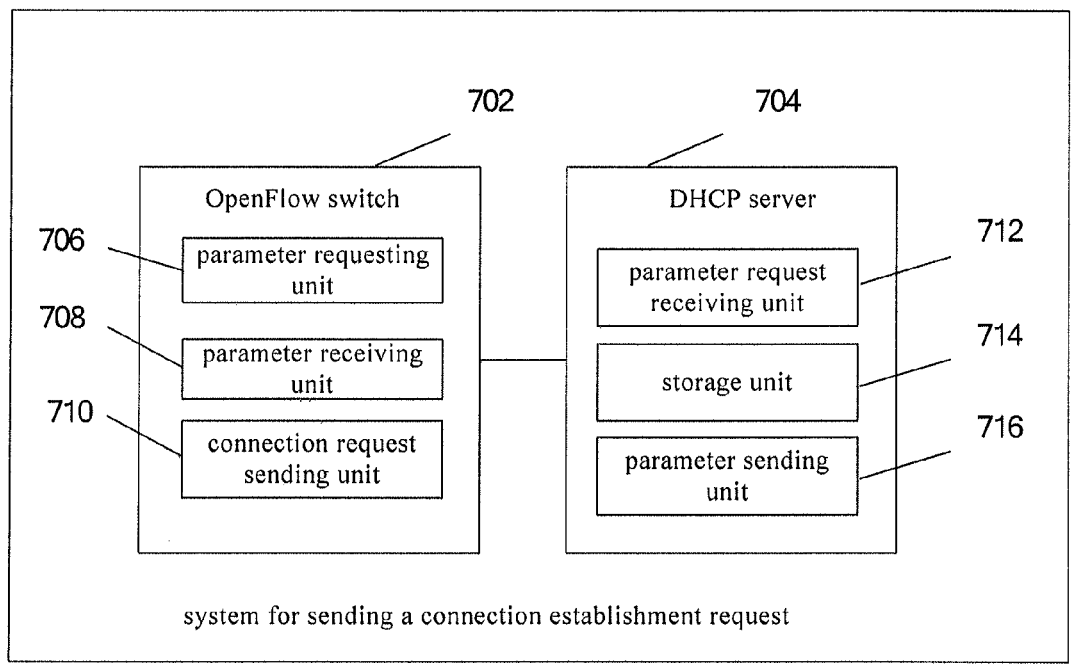
FIG. 7 is a schematic diagram of a system for sending a connection establishment request provided in an embodiment of the disclosure.

Referring to FIG. 7, an embodiment of the disclosure provides a system for sending a connection establishment request, wherein the system is suitable for an OpenFlow network with forwarding and control element separation, the system comprising an OpenFlow switch 702 and a configuration server 704, wherein:

the OpenFlow switch 702 comprises:

a parameter requesting unit 706, configured to send a parameter requesting message to the configuration server 704, the parameter requesting message being configured to request connection parameters of an OpenFlow controller;

a parameter receiving unit 708, configured to receive an Internet Protocol (IP) address and a set of OpenFlow controller connection parameters sent by the configuration server 704, the set of connection parameters comprising at least connection parameters of a first OpenFlow controller; and a connection request sending unit 710, configured to send a connection establishment requesting message to the first OpenFlow controller according to the IP address and the connection parameters of the first OpenFlow controller sent from the configuration server 704; and the configuration server 704 comprises:

a parameter request receiving unit 712, configured to receive the parameter requesting message sent from the OpenFlow switch 702, the parameter requesting message being configured to request connection parameters of OpenFlow controllers;

a storage unit 714, configured to store a set of connection parameters of the OpenFlow controllers in the OpenFlow network, the set of connection parameters comprising at least connection parameters of a first OpenFlow controller; and a parameter sending unit 716, configured to send an Internet Protocol (IP) address and the set of OpenFlow controller connection parameters to the OpenFlow switch 702 according to the parameter requesting message.

In a particular implementation of the embodiment, before the OpenFlow switch 702 sends the parameter requesting message to the configuration server 704, the OpenFlow switch 702 and the configuration server 704 may execute a layer 2 network communication protocol in advance. The OpenFlow switch 702 generates a first path, which is a path from the OpenFlow switch 702 to the configuration server 704, and the OpenFlow switch 702 sends the parameter requesting message through the first path. The layer 2 network communication protocol may be a MSTP or TRILL protocol or 802.1aq. When the layer 2 network communication protocol is MSTP, the configuration server 704 is configured to be a MSTP root node.

Optionally, the configuration server 704 may be a DHCP server or a PPPoE server.

Optionally, the configuration server 704 can be configured in advance such that after receiving a parameter requesting message sent from the OpenFlow switch 702, the configuration server 704 may send the set of OpenFlow controller connection parameters to the OpenFlow switch 702. The configuration server 704 may also determine from information carried by the parameter requesting message that the parameter requesting message is used to obtain the connection parameters of the OpenFlow controller. Particularly, when the configuration server 704 is a DHCP server, the parameter requesting message is a DHCP requesting message, which further comprises a first expanded DHCP option configured to identify that the parameter requesting message is used to obtain the connection parameters of the OpenFlow controller, particular implementation of which may refer to the corresponding description of the method for sending the connection establishment request provided in the above embodiments of the disclosure. When the configuration server 704 is a PPPoE server, the parameter requesting message is a PPPoE requesting message and reference can be made to RFC2516 for particular implementation. Optionally, the PPPoE requesting message may further comprise a first expanded TAG configured to identify that the parameter requesting message is used to obtain the connection parameters of the OpenFlow controller, particular implementation of which may refer to the corresponding description of the method for sending the connection establishment request provided in the above embodiments of the disclosure.

The configuration server 704 needs to store the connection parameters of the OpenFlow controllers in the network it serves in advance. The configuration server 704 may store the connection parameters of some or all OpenFlow controllers in the network it serves.

Optionally, the configuration server 704 may further comprise a configuration unit configured to configure the connection parameters of the first OpenFlow controller to the storage unit 714.

Optionally, the configuration server 704 may further comprise a parameter obtaining unit, and the parameter obtaining unit is configured to obtain the connection parameters of the first OpenFlow controller from the first OpenFlow controller, and to forward the connection parameters of the first OpenFlow controller to the storage unit 714. After the parameter obtaining unit 712 of the configuration server 704 receives the parameter requesting message sent from the parameter requesting unit 706 of the configuration server 704, the parameter sending unit 716 sends a parameter reply message to the parameter receiving unit 708 of the OpenFlow switch 702, and the parameter reply message may comprise an IP address allocated to the OpenFlow switch 702. The IP address sent from the parameter sending unit 716 of the configuration server 704 to the parameter receiving unit 708 of the OpenFlow switch 702 is carried by the parameter requesting message. After the parameter receiving unit 708 of the OpenFlow switch 702 receives the DHCP reply message, the OpenFlow switch 702 is configured with the IP address. The set of connection parameters sent from the parameter sending unit 716 of the configuration server 704 to the parameter receiving unit 708 of the OpenFlow switch 702 can be also contained in the parameter reply message. When the configuration server 704 is a DHCP server, the parameter reply message is a DHCP reply message, and the connection parameters of the first OpenFlow controller is carried by a second expanded DHCP option. When the configuration server 704 is a PPPoE server, the parameter reply message is a PPPoE reply message, and the connection parameters of the first OpenFlow controller is carried by a second expanded TAG. For particular implementation, reference can be made to the corresponding description of the method for sending a connection establishment request provided in the above embodiments of the disclosure. The set of connection parameters comprises at least the connection parameters of the first OpenFlow controller, which may be any one of the OpenFlow controllers in the OpenFlow network served by the configuration server 704.

Optionally, the set of connection parameters sent from the configuration server 704 to the OpenFlow controller 702 may be sent by the parameter sending unit 716 of the configuration server 704 through a configuration management channel. The configuration management channel may be established by the OpenFlow switch 702 and the configuration server 704 according to the OpenFlow management and Configuration Protocol (OF-config) in advance. Reference can be made to OF-config defined by ONF for the particular implementation of establishing the configuration management channel.

Optionally, when there are connection parameters of only one OpenFlow controller in the set of connection parameters, the OpenFlow switch 702 directly selects the connection parameters of that OpenFlow controller as connection parameters of the first OpenFlow controller; when there are connection parameters of a plurality of OpenFlow controllers in the set of connection parameters, connection parameters of a certain OpenFlow controller can be selected as connection parameters of the first OpenFlow controller according to a certain selection criteria. The selection criteria may be defined by users themselves. For example, the OpenFlow switch 702 may be configured in advance to select an OpenFlow controller that meets a following condition: the selected OpenFlow controller has an IP address belonging to a certain network segment.

Optionally, the OpenFlow switch 702 further comprises a flow table receiving unit and a flow table storage unit, wherein:

the flow table receiving unit is configured to receive a layer 2 network communication flow table and an automatic configuration network flow table;

the flow table storage unit is configured to store the layer 2 network communication flow table and the automatic configuration network flow table received by the flow table receiving unit.

Information on a path from the OpenFlow switch 702 to the configuration server 704 is stored in the layer 2 network communication flow table and the automatic configuration network flow table, and the path information may be generated as follows.

After a connection is established between the first OpenFlow controller and the OpenFlow switch 702, the OpenFlow switch 702 and the configuration server 704 execute a neighbor discovery protocol, and the first OpenFlow controller executes a neighbor discovery protocol and a topology collection protocol. The first OpenFlow controller calculates path information from the OpenFlow switch 702 to the configuration server 704 based on the neighbor discovery protocol and the topology collection protocol. The neighbor discovery protocol may be LLDP or ISIS, and the topology collection protocol may be OFDP or NTDP. The neighbor discovery protocol executed by the OpenFlow switch 702 has to be in consistent with the neighbor discovery protocol executed by the configuration server 704. For instance, in a case where the first OpenFlow switch 702 executes LLDP, the configuration server 704 has to execute LLDP also.

Optionally, the flow table receiving unit is further configured to receive a control channel protocol flow table sent from the first OpenFlow controller.

Correspondingly, the flow table storage unit is further configured to store the control channel protocol flow table.

The control channel protocol flow table may contain information about optimal path from the OpenFlow switch 702 to the first OpenFlow controller, and the optimal path may be generated as follows.

The OpenFlow switch 702 sends a connection establishment requesting message to the first OpenFlow controller. After a connection is established between the first OpenFlow controller and the OpenFlow switch 702, the OpenFlow switch 702 executes a neighbor discovery protocol, and the first OpenFlow controller executes a neighbor discovery protocol and a topology collection protocol. The first OpenFlow controller calculates an optimal path to the OpenFlow switch 702 based on the neighbor discovery protocol and the topology collection protocol. The optimal path is a path having the lowest load which is selected upon a comprehensive consideration of load situations of all paths between the OpenFlow switch 702 and the first OpenFlow controller. Optionally, the optimal path is the shortest path between the OpenFlow switch 702 and the first OpenFlow controller. Subsequent connection interactive packets between the OpenFlow switch 702 and the first OpenFlow controller will be forwarded according to the control channel protocol flow table. For example, when the OpenFlow switch 702 receives a connection establishment requesting message sent to the first OpenFlow controller from another OpenFlow switch, the OpenFlow switch 702 forwards the connection establishment requesting message to the first OpenFlow controller by using of the control channel protocol flow table.

Optionally, the OpenFlow switch 702 further comprises a closing message receiving unit and a closing control unit, wherein:

the closing message receiving unit is configured to receive a layer 2 network communication protocol function closing message that is sent from the first OpenFlow controller on an established control channel after the connection is established between the first OpenFlow controller and the OpenFlow switch 702;

the closing control unit is configured to close the layer 2 network communication protocol function after the closing message receiving unit receives the layer 2 network communication protocol function closing message. The layer 2 network communication protocol message interaction between the OpenFlow switch 702 and the configuration server 704 takes advantage of the layer 2 network communication flow table, and the configuration message interaction between the OpenFlow switch 702 and the configuration server 704 takes advantage of the network automatic configuration flow table.

When the configuration server 704 is a DHCP server, the DHCP server may be a regular DHCP server, an OpenFlow controller or OpenFlow switch having functions of a DHCP server, or a regular router or switch having a functions of a DHCP server. When the configuration server 704 is a PPPoE server, the PPPoE server may be an access concentrator (AC), an OpenFlow controller or OpenFlow switch having functions of a PPPoE server, or a regular router or switch having a functions of a PPPoE server.

Optionally, the above units provided in the embodiments of the disclosure can be combined into one or several units.

Thus, with the system provided in the embodiments of the disclosure, in the OpenFlow network, through obtaining the connection parameters of the OpenFlow controller from the configuration server 704, the OpenFlow switch 702 may actively send a connection establishment request to the OpenFlow controller, thereby realizing the automatic connection establishment between the OpenFlow switch 702 and the OpenFlow controller.

The term "first" in the first OpenFlow controller, the first expanded DHCP option and the first TAG mentioned in the embodiments of the disclosure is merely used as a name identifier, but not to imply the first in order. Also, the term "second" used in the second expanded DHCP option and the second expanded TAG is merely a name identifier, but not to imply the second in order.

Persons ordinary skill in the art may understand that all or part steps of the above method embodiments can be implemented by program instruction relevant hardware such as a hardware processor accessible to a computer readable storage medium. The program described above can be stored in a computer readable storage medium, which when executed may perform steps contained in the above method embodiments. The storage medium described above may include: ROM, RAM, magnetic disks, optical disks and various mediums capable of storing program codes.

At last, it should be noted that the above embodiments are merely given to illustrate the solution of the disclosure, and are not limitation to the disclosure. Although the disclosure has been described in detail with reference to the above embodiments, persons ordinary skill in the art may appreciate that modifications to the solution described in various embodiment or alternations of its some parts can be made; those modifications and alternations may not cause the subject matters of corresponding solutions to depart from the spirits and scopes of the solutions of various embodiments of the disclosure.

The invention claimed is:

1. A method for sending a connection establishment request in an OpenFlow network with forwarding and control element separation, comprising:
   sending, by an OpenFlow switch, a parameter requesting message to a configuration server, the parameter requesting message being used for obtaining connection parameters of an OpenFlow controller;
   receiving, by the OpenFlow switch, an Internet Protocol (IP) address and a set of connection parameters of an OpenFlow controller sent from the configuration server, the set of connection parameters comprising at least connection parameters of a first OpenFlow controller;
   sending, by the OpenFlow switch, a connection establishment request message to the first OpenFlow controller according to the IP address and the connection parameters of the first OpenFlow controller sent from the configuration server;
   before the OpenFlow switch sends the parameter requesting message to the configuration server,
   executing by the OpenFlow switch and the configuration server a layer 2 network communication protocol, and generating by the OpenFlow switch a first path according to the layer 2 network communication protocol, wherein the first path is a path from the OpenFlow switch to the configuration server, and the OpenFlow switch sends the parameter requesting message through the first path;
   after the OpenFlow switch sends the connection establishment request message to the first OpenFlow controller:
   receiving, by the OpenFlow switch, a layer 2 network communication flow table and an automatic configuration network flow table sent from the first OpenFlow controller and storing the layer 2 network communication flow table and the automatic configuration network flow table, wherein the layer 2 network communication flow table and the automatic configuration network flow table contain information regarding a path from the OpenFlow switch to the configuration server, and the path information is generated as follows:
      after a connection is established between the first OpenFlow controller and the OpenFlow switch, the OpenFlow switch and the configuration server execute a neighbor discovery protocol, and the first OpenFlow controller executes a neighbor discovery protocol and a topology collection protocol, calculating by the first OpenFlow controller information regarding the path from the OpenFlow switch to the configuration server based on the neighbor discovery protocol and the topology collection protocol;
   using the layer 2 network communication flow table for interaction of a layer 2 network communication protocol messages between the OpenFlow switch and the configuration server, and
   using the automatic configuration network flow table for interaction of configuration messages between the OpenFlow switch and the configuration server.

2. The method according to claim 1, wherein the connection parameters of the first OpenFlow controller comprises:
   an IP address of the first OpenFlow controller, a port number for connection establishment of the first OpenFlow controller and a connection establishment type of the first OpenFlow controller.

3. The method according to claim 1, wherein before the OpenFlow switch sends the connection establishment request message to the first OpenFlow controller, the method further comprises:
   executing the layer 2 network communication protocol between the first OpenFlow controller and the OpenFlow switch, and generating a second path by the OpenFlow switch, wherein the second path is a path from the OpenFlow switch to the first OpenFlow controller, and the OpenFlow switch sends the connection establishment request message through the second path.

4. The method according to claim 1, wherein when the configuration server is a Dynamic Host Configuration Protocol (DHCP) server,
   the parameter requesting message is a DHCP request message, comprising a first expanded DHCP option for identifying that the DHCP request message is used for obtaining the connection parameters of an OpenFlow controller.

5. The method according to claim 1, wherein when the configuration server is a Point-to-Point protocol over Ethernet (PPPoE) server,
   the parameter requesting message is a PPPoE request message, comprising a first expanded TAG for identifying that the PPPoE request message is used for obtaining the connection parameters of an OpenFlow controller.

6. The method according to claim 4, wherein:
the IP address provided by the DHCP server is carried by a DHCP reply message;
the connection parameters of the first OpenFlow controller is carried by a second expanded DHCP option of the DHCP reply message, and the second expanded DHCP option comprises:
a code field, configured to identify whether the second expanded DHCP option contains OpenFlow controller connection parameters;
a length field, configured to identify a length of data content included in the second expanded DHCP option;
a number field, configured to identify a number of OpenFlow controller connection parameters carried by the second expanded DHCP option;
an address field, configured to identify the IP address of the first OpenFlow controller in the OpenFlow controller connection parameters contained in the second expanded DHCP option;
a connection type field, configured to identify a connection establishment type of the first OpenFlow controller in the OpenFlow controller connection parameters contained in the second expanded DHCP option;
a port number field, configured to identify a connection establishment port of the first OpenFlow controller in the OpenFlow controller connection parameters contained in the second expanded DHCP option.

7. The method according to claim 6, wherein the connection parameters of the first OpenFlow controller comprises a status of the first OpenFlow controller, wherein the status of the first OpenFlow controller is particularly a primary status or a backup status; correspondingly, the second expanded DHCP option further comprises a status field for identifying the status of the connection parameters of the first OpenFlow controller, and wherein the status is a primary status or a backup status.

8. The method according to claim 4, wherein:
the IP address provided by the DHCP server is carried by a DHCP reply message;
the connection parameters of the first OpenFlow controller are sent by the DHCP server through a configuration management channel, wherein the configuration management channel is established by the OpenFlow switch and the DHCP server through an OpenFlow configuration management protocol in advance.

9. The method according to claim 5, wherein:
the IP address provided by the PPPoE server is carried by a PPPoE reply message; the connection parameters of the first Open Flow controller are carried by a second expanded TAG of the PPPoE reply message, and the second expanded TAG comprises:
a code field, configured to identify whether the second expanded TAG contains Open Flow controller connection parameters;
a length field, configured to identify a length of data content included in the second expanded TAG;
a number field, configured to identify a number of Open Flow controller connection parameters carried by the second expanded TAG;
an address field, configured to identify the IP address of the first OpenFlow controller in the OpenFlow controller connection parameters contained in the second expanded TAG;
a connection type field, configured to identify a connection establishment type of the first OpenFlow controller in the OpenFlow controller connection parameters contained in the second expanded TAG;
a port number field, configured to identify a connection establishment port of the first OpenFlow controller in the OpenFlow controller connection parameters contained in the second expanded TAG.

10. The method according to claim 5, wherein:
the IP address provided by the PPPoE server is carried by a PPPoE reply message;
the connection parameters of the first OpenFlow controller is sent by the PPPoE server through a configuration management channel, wherein the configuration management channel is established by the OpenFlow switch and the PPPoE server through an OpenFlow configuration management protocol in advance.

11. A non-transitory computer-readable medium comprising computer-executable instructions that may be executed by a processor to perform the steps of:
executing a layer 2 network communication protocol, and generating a first path according to the layer 2 network communication protocol, wherein the first path is a path from an OpenFlow switch to a configuration server;
sending a parameter requesting message to a configuration server, the parameter requesting message being used for obtaining connection parameters of an OpenFlow controller;
receiving an Internet Protocol (IP) address and a set of OpenFlow controller connection parameters sent from the configuration server, the set of connection parameters comprising at least connection parameters of a first OpenFlow controller;
sending a connection establishment request message to the first OpenFlow controller according to the IP address and the connection parameters of the first OpenFlow controller sent from the configuration server;
receiving a layer 2 network communication flow table and an automatic configuration network flow table sent from the first OpenFlow controller, wherein information about a path from the OpenFlow switch to the configuration server is stored in the layer 2 network communication flow table, and information about a path from the OpenFlow switch to the configuration server is stored in the automatic configuration network flow table; and
storing the layer 2 network communication flow table and the automatic configuration network flow table received by a flow table receiving unit;
after a connection is established between the first OpenFlow controller and the OpenFlow switch, executing, by the OpenFlow switch and the configuration server, a neighbor discovery protocol, and executing, by the first OpenFlow controller, a neighbor discovery protocol and a topology collection protocol, calculating by the first OpenFlow controller information regarding the path from the OpenFlow switch to the configuration server based on the neighbor discovery protocol and the topology collection protocol;
using the layer 2 network communication flow table for interaction of a layer 2 network communication protocol messages between the OpenFlow switch and the configuration server, and
using the automatic configuration network flow table for interaction of configuration messages between the OpenFlow switch and the configuration server.

12. The method according to claim 1, wherein after the OpenFlow switch sends the connection establishment request message to the first OpenFlow controller, the method comprises:
receiving, by the OpenFlow switch, a control channel protocol flow table sent from the first OpenFlow controller and storing the control channel protocol flow table, wherein information about an optimal path from the OpenFlow switch to the first OpenFlow controller is stored in the control channel protocol flow table; and generating an optimal path after a connection is established between the first OpenFlow controller and the OpenFlow switch, wherein the OpenFlow switch executes a neighbor discovery protocol, and the first OpenFlow controller executes a neighbor discovery protocol and a topology collection protocol, the first OpenFlow controller calculates the optimal path from the OpenFlow switch to the OpenFlow controller based on the neighbor discovery protocol and the topology collection protocol.

13. The method according to claim 12, further comprising:

receiving, by the OpenFlow switch, a layer 2 network communication protocol function closing message sent from the first OpenFlow controller, wherein the OpenFlow switch closes the layer 2 network communication protocol function accordingly, wherein the layer 2 network communication protocol messages interacts between the OpenFlow switch and the configuration server take advantage of the layer 2 network communication flow table, and the interaction between the OpenFlow switch and the configuration server takes advantage of the automatic configuration network flow table.

14. The non-transitory computer-readable medium according to claim 11, further comprising computer-executable instructions for performing following steps:

receiving a control channel protocol flow table sent from the first OpenFlow controller, wherein the control channel protocol flow table contains an optimal path from the OpenFlow switch to the first OpenFlow controller, storing the control channel protocol flow table; and receiving a layer 2 network communication protocol function closing message sent from the first OpenFlow controller.

15. The non-transitory computer-readable medium according to claim 14, further comprising computer-executable instructions for performing following steps:

closing a layer 2 network communication protocol function after receiving the layer 2 network communication protocol function closing message, wherein the layer 2 network communication protocol message interact between the OpenFlow switch and the configuration server take advantage of the layer 2 network communication flow table, and the interaction between the OpenFlow switch and the configuration server takes advantage of the automatic configuration network flow table.

* * * * *